United States Patent
He

(10) Patent No.: US 8,052,115 B2
(45) Date of Patent: Nov. 8, 2011

(54) INSERT MOLDING APPARATUS

(75) Inventor: Peng He, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 593 days.

(21) Appl. No.: 12/230,645

(22) Filed: Sep. 3, 2008

(65) Prior Publication Data

US 2010/0055229 A1 Mar. 4, 2010

(51) Int. Cl.
*B22D 19/04* (2006.01)
(52) U.S. Cl. ............ 249/95; 249/83; 425/116; 425/125; 425/123; 264/272.15
(58) Field of Classification Search ............... 249/95, 249/83; 425/116, 125, 123; 264/272.15
See application file for complete search history.

(56) References Cited

U.S. PATENT DOCUMENTS

| | | | | |
|---|---|---|---|---|
| 3,427,688 A | * | 2/1969 | Wilson | 425/127 |
| 4,332,537 A | * | 6/1982 | Slepcevic | 425/121 |
| 4,368,168 A | * | 1/1983 | Slepcevic | 264/272.14 |
| 4,377,895 A | * | 3/1983 | Komatsu | 29/434 |
| 4,586,886 A | * | 5/1986 | Prischak et al. | 425/123 |
| 6,532,694 B1 | * | 3/2003 | Gathright | 43/42.53 |
| 7,241,405 B1 | * | 7/2007 | Crain et al. | 264/39 |

* cited by examiner

*Primary Examiner* — Yogendra Gupta
*Assistant Examiner* — Ninh Le
(74) *Attorney, Agent, or Firm* — Cheng-Ju Chiang

(57) ABSTRACT

An insert molding apparatus includes a first mold and a second mold. The first mold has at least two cavity plates which cooperatively define at least one receiving groove therebetween. At least two connecting elements each have its one end positioned in one of the at least two cavity plates while the other end passing through the other cavity plate for movably connecting the at least two cavity plates with each other. At least one elastic element is compressibly disposed between and against the cavity plates in such a manner such that the at least two cavity plates are capable of contacting with each other or separating from each other. The second mold is engaged with the first mold for compelling one of the at least two cavity plates to move toward the other cavity plate so that the at least two cavity plates are in contact with each other.

8 Claims, 5 Drawing Sheets

INSERT MOLDING APPARATUS

BACKGROUND OF THE INVENTION

1. Field of the Invention

The present invention relates to an insert molding apparatus, and particularly to an insert molding apparatus adapted for producing one-piece products obtained by coating insert components placed in the insert molding apparatus with resinous material and shaping the resinous material.

2. The Related Art

The insert molding technique is broadly used in various fields by putting insert components in an insert molding apparatus and then injecting molten resinous material in the insert molding apparatus to coat on the insert components for forming one-piece products.

The insert molding apparatus conventionally includes two cavity plates which form a plurality of inserting cavities therebetween for receiving the insert components therein. The distance between the two cavity plates is predetermined and cannot be adjusted, thus it is hard to place the insert components in the inserting cavities and further the insert components are easily deformed in the process of being placed in the inserting cavities. Therefore, an improved insert molding apparatus capable of overcoming the disadvantage is required.

SUMMARY OF THE INVENTION

Accordingly, an object of the present invention is to provide an improved insert molding apparatus including a first mold and a second mold. The first mold has at least two cavity plates which cooperatively define at least one receiving groove therebetween. At least two connecting elements each have its one end positioned in one of the at least two cavity plates while the other end passing through the other cavity plate for movably connecting the at least two cavity plates with each other. At least one elastic element is compressibly disposed between and against the cavity plates in such a manner such that the at least two cavity plates are capable of contacting with each other or separating away from each other. The second mold is engaged with the first mold for compelling one of the at least two cavity plates to move toward the other cavity plate so that the at least two cavity plates become in contact with each other.

As described above, the insert molding apparatus employs the elastic element to adjust the distance between the cavity plates, so that an insert component is conveniently placed in the receiving groove of the first mold, which improves the quality and the efficiency of the insert molding.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
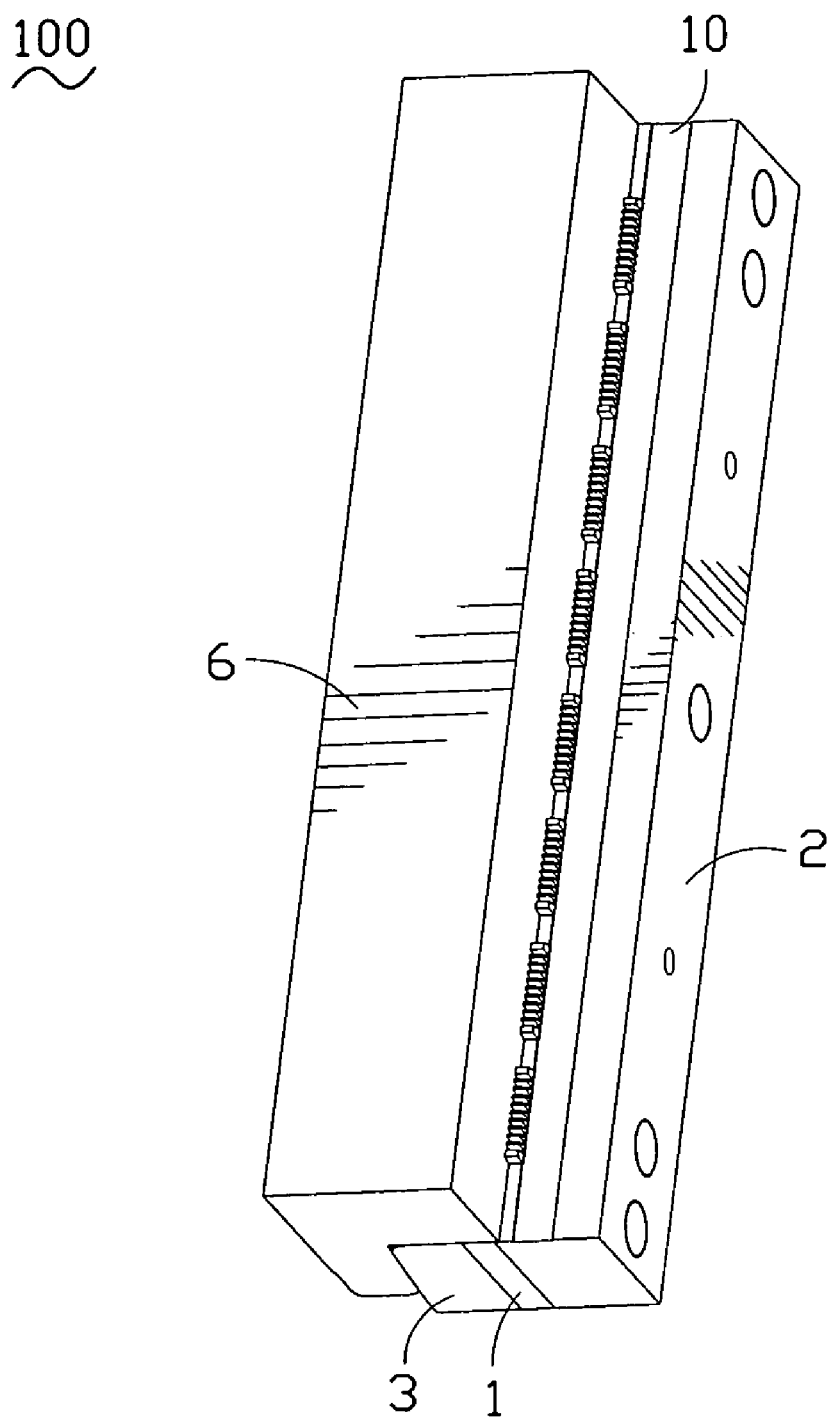
FIG. 1 is a perspective view of an insert molding apparatus of the present invention.

Referring to FIG. 1, an insert molding apparatus 100 according to the present invention is disclosed that includes a lower mold 10 and an upper mold 6 engaged with the lower mold 10 for fastening the lower mold 10 thereto.

Figure 2:
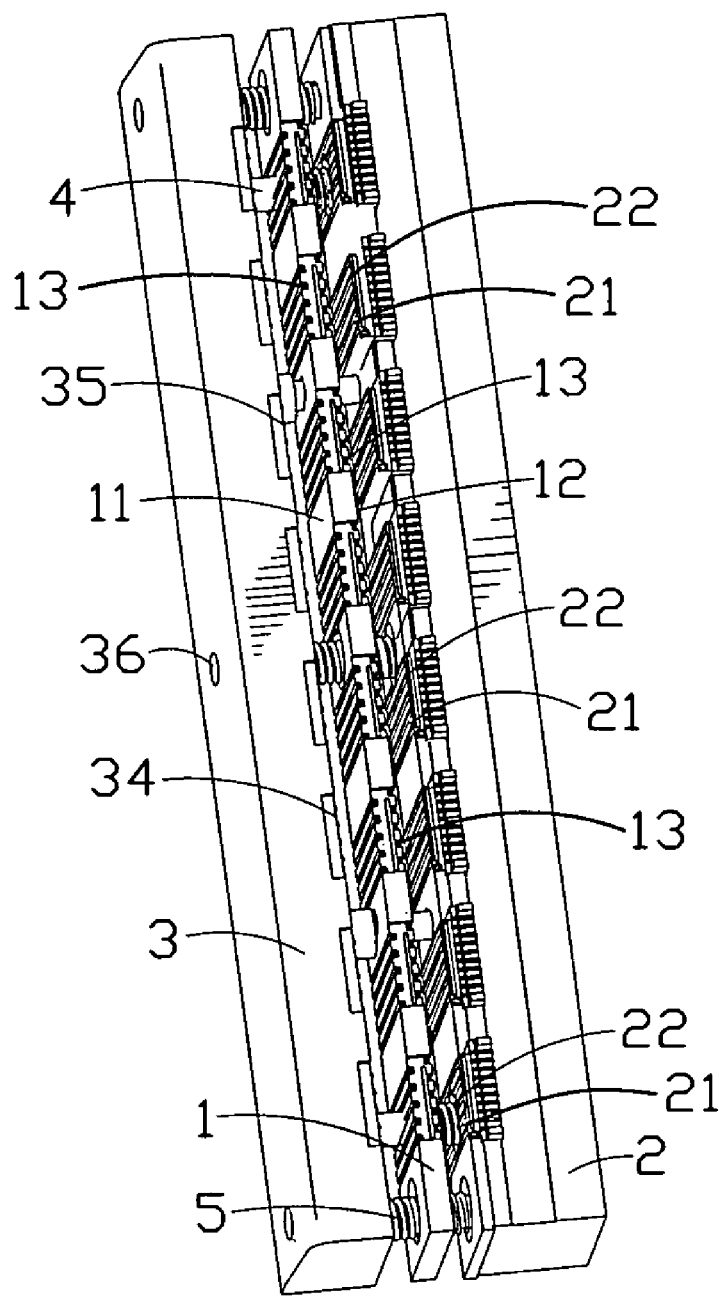
FIG. 2 is a perspective view of a lower mold of the insert molding apparatus.
Figure 3:
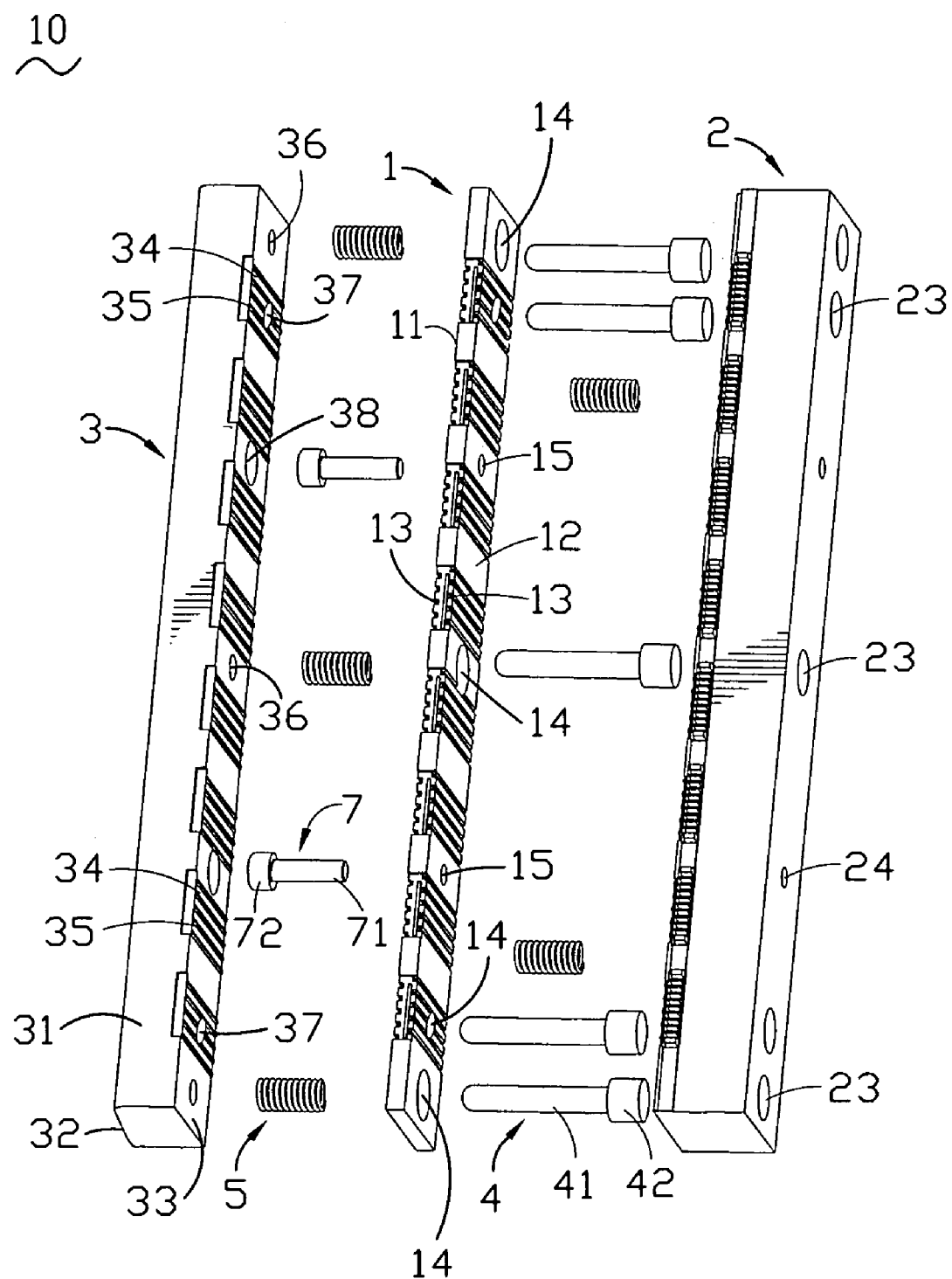
FIG. 3 is an exploded view of the lower mold.

With reference to FIG. 2 and FIG. 3, the lower mold 10 includes a first cavity plate 1 including a second cavity plate 2 and a third cavity plate 3 both of which are disposed at lateral sides of the first cavity plate 1. The lower mold 10 further includes a plurality of connecting elements 4 and a plurality of elastic elements 5 cooperating with the connecting elements 4 for elastically and movably connecting the first cavity plate 1 with the second cavity plate 2 and the third cavity plate 3 together. The first cavity plate 1 is a long strip of rectangular plate and defines a first sidewall 11 and an opposed second sidewall 12. The first sidewall 11 and the second sidewall 12 each define a plurality of groups of receiving grooves 13 therein. Every two groups of the receiving grooves 13 defined on the first sidewall 11 and the second sidewall 12 respectively are disposed in a back to back fashion. Five first through holes 14 are defined in the first cavity plate 1 and pass through the first sidewall 11 and the second sidewall 12, wherein two of the first through holes 14 are respectively disposed at two tip ends of the first cavity plate 1 while one of the five first through holes 14 is disposed at a middle portion of the first cavity plate 1 and the rest two of the first through holes 14 are respectively adjacent to the two first through holes 14 defined at the tip ends of the first cavity plate 1. Two second through holes 15 are respectively defined at substantially middle portions between the first through hole 14 defined at the middle portion of the first cavity plate 1 and the first through holes 14 defined at the tip ends of the first cavity plate 1.

The second cavity plate 2 that may contact the second sidewall 12 of the first cavity plate 1 is rectangular in shape and defines a plurality of groups of first retaining cavities 21 at one lateral side thereof for matching with the second sidewall 12. A first jamming block 22 protrudes sideward from the side of the second cavity plate 2 between every two of the adjacent first retaining cavities 21. The second cavity plate 2 defines five fixing holes 23 passing through lateral sides thereof and aligned with the first through holes 14 of the first cavity plate 1, and two receiving apertures 24 passing through the lateral sides thereof and aligned with the second through holes 15 of the first cavity plate 1.

The third cavity plate 3 that may keep contact with the first sidewall 11 of the first cavity plate 1 defines a top surface 31. A first side surface 32 smoothly slantways extends downward from the top surface 31, so that the width of the third cavity plate 3 becomes wider and wider from top to bottom. A second side surface 33 vertically extends downward from the top surface 31 and opposite to the first side surface 32. The second side surface 33 defines a plurality of groups of second retaining cavities 34 adapted for matching with the first sidewall 11. A second jamming block 35 protrudes sideward between every two of the adjacent second retaining cavities 34. The third cavity plate 3 defines three accommodating holes 36 respectively disposed at tip ends and a middle portion thereof and passing through the first side surface 32 and the second side surface 33 thereof. Two first concave cavities 37 are defined in the second side surface 33 and adjacent to the accommodating holes 36 defined at the tip ends of the third cavity plate 3. The third cavity plate 3 defines two second concave cavities 38 in the second side surface 33 thereof at a middle portion between every two of the adjacent accommodating holes 36.

Each of the connecting elements 4 has a connecting shaft 41 in column-shape. A tip end of the connecting shaft 41 protrudes therearound to form a locating portion 42. Each of the elastic elements 5 is a spiral spring.

Referring to FIG. 2 and FIG. 3 again, the lower mold 10 further includes two guiding elements 7 each of which has a guiding pillar 71 in column-shape and a fixing portion 72 protruding outward at an end of the guiding pillar 71.

In assembly of the lower mold 10, the locating portions 42 of the connecting elements 4 are respectively fixed in the fixing holes 23 of the second cavity plate 2. The connecting shafts 41 of the connecting elements 4 pass through the first through holes 14 of the first cavity plate 1 and are respectively received in the accommodating holes 36 and the first concave cavities 37 of the third cavity plate 3. The fixing portions 72 of the guiding elements 7 are respectively located in the second concave cavities 38 defined on the third cavity plate 3, whereas the guiding portions 71 pass through the second through holes 15 defined on the first cavity plate 1 and received in the receiving apertures 24 defined on the second cavity plate 2. The elastic elements 5 surround the connecting shafts 41 respectively and some of the elements 5 are disposed between the first cavity plate 1 and the second cavity plate 2, whilst the rest of the elements 5 are sandwiched between the second cavity plate 2 and the third cavity plate 3.

Figure 4:
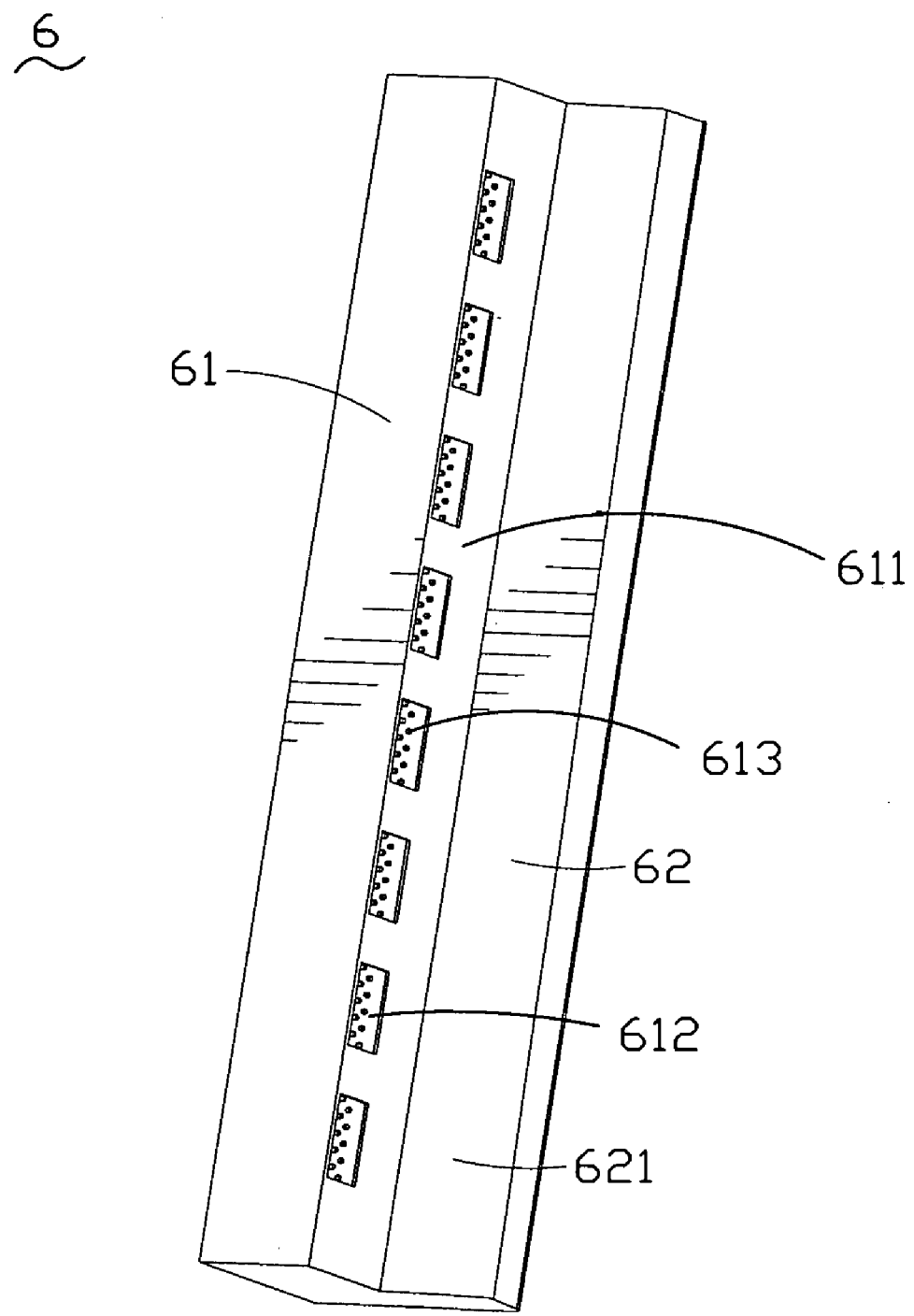
FIG. 4 is a perspective view of an upper mold of the insert molding apparatus.

Referring to FIG. 4, the upper mold 6 has a cover portion 61 and a pushing portion 62 extending downwardly from a side edge of the cover portion 61. The cover portion 61 defines a bottom surface 611. The bottom surface 611 defines a plurality of sunken cavities 612 thereon. A plurality of protruding posts 613 stretches downwardly in each of the sunken cavities 612. The pushing portion 62 has a pushing surface 621 which is inclined relative to the cover portion 61, so that the width of the pushing portion 62 becomes narrower and narrower from top to bottom.

Figure 5:
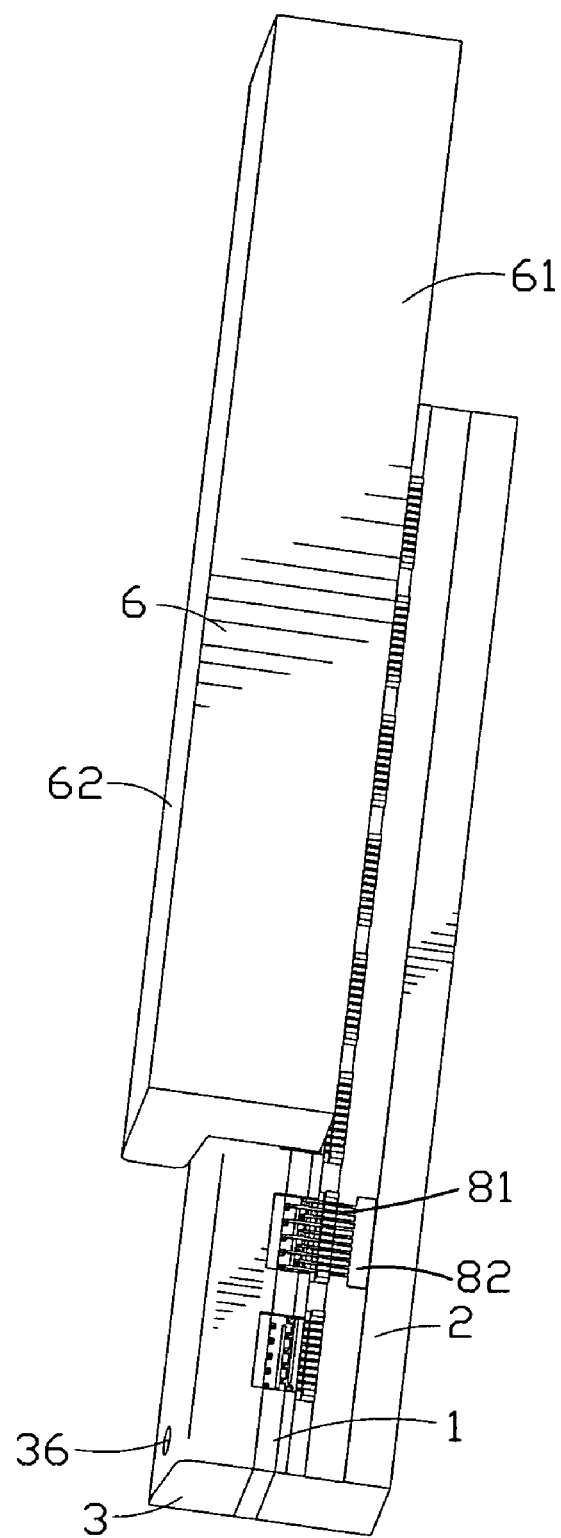
FIG. 5 is a perspective view showing that the upper mold and the lower mold are engaged with each other.

Please refer to FIG. 1, FIG. 2 and FIG. 5. In use, a side opposite to the side defining the first retaining cavities 21 of the second cavity plate 2 may be secured or supported on a fixture such that the second cavity plate 2 is temporarily kept stationary. The elastic elements 5 release elastic force to separate the first cavity plate 1 apart from the second cavity plate 2 and the third cavity plate 3 apart from the first cavity plate 1. Insert components 81 all of which are divided into a plurality of groups each of which connects with a strip 82 are placed into the receiving grooves 13 of the first cavity plate 1 correspondingly. Then, the upper mold 6 and the lower mold 10 are closed together. The pushing surface 621 of the pushing portion 62 of the upper mold 6 compresses the first side surface 32 of the third cavity plate 3 sideward to make the lower mold 10 be closed, wherein the elastic elements 5 are compressed and the first jamming blocks 22 of the second cavity plate 2 and the second jamming blocks 35 of the third cavity plate 3 are correspondingly wedged in the receiving grooves 13 to close the insert components 81 in the receiving grooves 13. The cover portion 61 of the upper mold 6 is covered on the lower mold 10 and the protruding posts 613 correspondingly resist against the insert components 81 for positioning the insert components 81 in the receiving grooves 13. Then, molten resinous material is injected in the receiving grooves 13 and coated on the insert components 81 for forming one-piece products (not shown).

As described above, the insert molding apparatus 100 employs the elastic elements 5 surrounding the connecting shafts 41 of the connecting elements 4 to adjust the distance between the first cavity plate 1 and the second cavity plate 2 and between the first cavity plate 1 and the third cavity plate 3, so that the insert components 81 can be conveniently positioned in receiving grooves 13 of the lower mold 10, which improves the quality and the efficiency of the insert molding.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An insert molding apparatus, comprising:
a first mold having:
at least two cavity plates, at least one receiving groove defined in one of the at least two cavity plates, and a jamming block defined in the other cavity plate for corresponding to the receiving groove;
at least two connecting elements, one end of each of the at least two connecting elements positioned in one of the at least two cavity plates while the other end of the each connecting element passing through the other cavity plate for movably connecting the at least two cavity plates with each other, and
at least one elastic element compressibly disposed between and against the at least two cavity plates in such a manner that the at least two cavity plates are capable of contacting with each other or separating away from each other; and
a second mold engaged with the first mold for compelling one of the at least two cavity plates to move toward the other cavity plate so that the at least two cavity plates are in contact with each other;
wherein the jamming block protrudes from a bottom of a retaining cavity which is defined in the same cavity plate as the jamming block.

2. The insert molding apparatus as claimed in claim 1, wherein the connecting element is sleeved into the elastic element.

3. The insert molding apparatus as claimed in claim 1, wherein one of the cavity plates defines at least one fixing hole therein and the other cavity plate defines at least one through hole passing therethrough, the connecting element has a connecting shaft of which an end protrudes outwards of peripheral sides of the connecting shaft to form a locating portion, the locating portion is fixed in the fixing hole, and the connecting shaft passes through the through hole.

4. The insert molding apparatus as claimed in claim 1, wherein the second mold has a cover portion disposed on the first mold and a pushing portion extending downwardly from the cover portion for compelling one of the cavity plates to move toward the other cavity plate.

5. The insert molding apparatus as claimed in claim 4, wherein the pushing portion has an inclined pushing surface relative to the cover portion, thickness of the pushing portion decreases from top to bottom of the pushing portion, while one of the cavity plates defines a top surface and a side surface smoothly slantways extending downwardly from the top surface to be in surface engagement with the pushing surface.

6. An insert molding apparatus, comprising:
a first mold having:
at least two cavity plates which cooperatively define at least one receiving groove between the at least two cavity plates;

at least two connecting elements, one end of each of the at least two connecting elements positioned in one of the at least two cavity plates while the other end of the each connecting element passing through the other cavity plate for movably connecting the at least two cavity plates with each other; and at least one elastic element compressibly disposed between and against the at least two cavity plates in such a manner that the at least two cavity plates are capable of contacting with each other or separating away from each other; and a second mold engaged with the first mold for compelling one of the at least two cavity plates to move toward the other cavity plate so that the at least two cavity plates are in contact with each other, and having a cover portion disposed on the first mold and a pushing portion extending downwardly from the cover portion for compelling one of the cavity plates to move toward the other cavity plate;

wherein the pushing portion has an inclined pushing surface relative to the cover portion, thickness of the pushing portion decreases from top to bottom of the pushing portion, and one of the cavity plates defines a top surface and a side surface smoothly slantways extending downwardly from the top surface to be in surface engagement with the pushing surface.

7. The insert molding apparatus as claimed in claim 6, wherein the connecting element is sleeved into the elastic element.

8. The insert molding apparatus as claimed in claim 6, wherein one of the cavity plates defines at least one fixing hole therein and the other cavity plate defines at least one through hole passing therethrough, the connecting element has a connecting shaft of which an end protrudes outwards of peripheral sides of the connecting shaft to form a locating portion, the locating portion is fixed in the fixing hole, and the connecting shaft passes through the through hole.

* * * * *